UNITED STATES PATENT OFFICE.

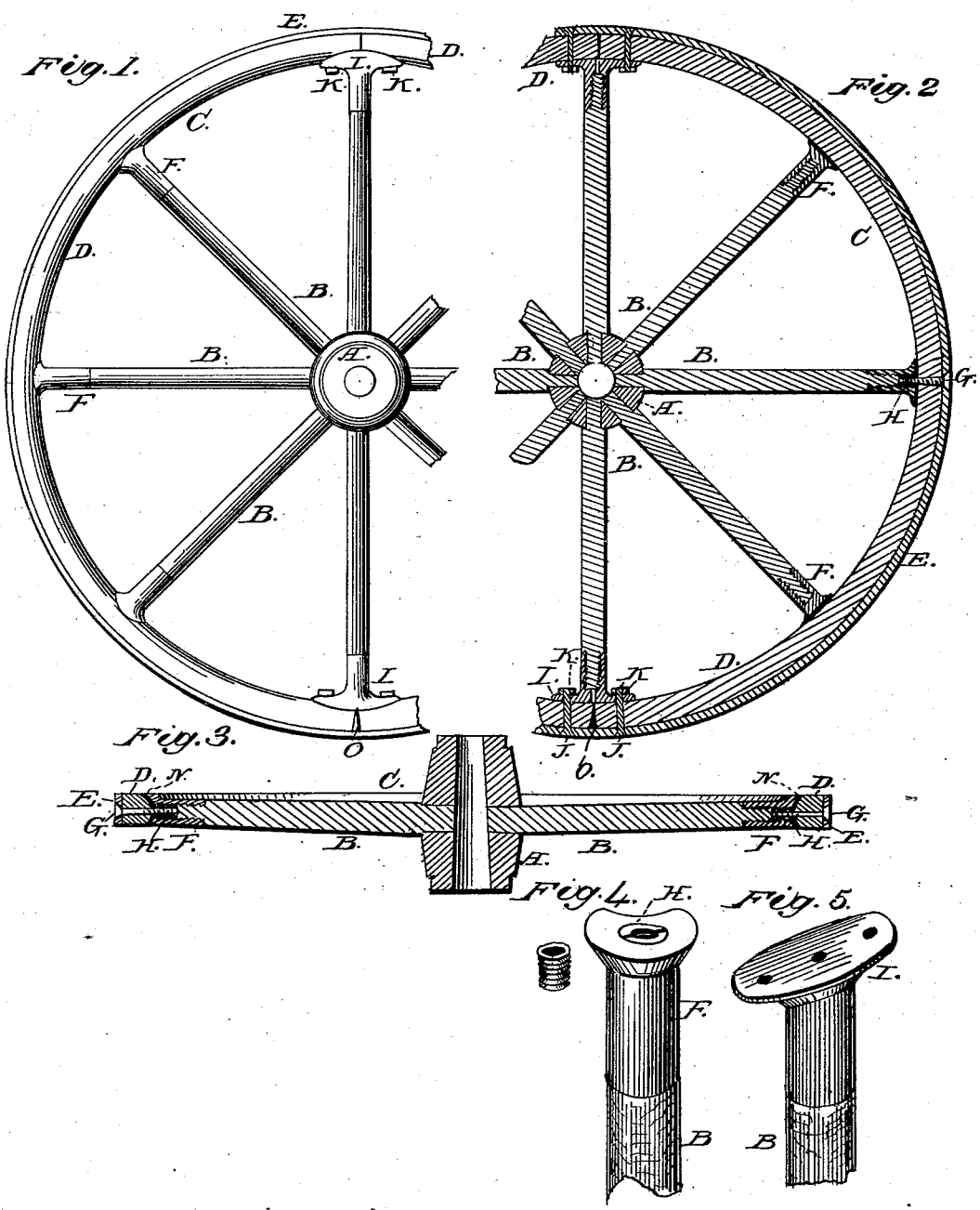

FREEMAN H. ROSSMAN, OF WAPPINGER'S FALLS, NEW YORK.

IMPROVEMENT IN VEHICLE-WHEELS.

Specification forming part of Letters Patent No. 216,762, dated June 24, 1879; application filed May 3, 1879.

*To all whom it may concern:*

Be it known that I, F. H. ROSSMAN, of Wappinger's Falls, in the county of Dutchess and State of New York, have invented certain new and useful Improvements in Vehicle-Wheels; and I do hereby declare that the following is a full, clear, and exact description thereof, which will enable others skilled in the art to which it appertains to make and use the same, reference being had to the accompanying drawings, which form a part of this specification.

Figure 1 is a side view. Fig. 2 is a vertical sectional view. Fig. 3 is a cross-section. Fig. 4 shows the spoke-thimble detached, and Fig. 5 is a similar view of the combined spoke-thimble and felly-plate.

Corresponding parts in the several figures are denoted by like letters of reference.

This invention relates to vehicle-wheels; and it consists in certain improvements in the construction of the same, which will be hereinafter fully described, and particularly pointed out in the claims.

In the drawings, A represents the hub; B B, the spokes; C, the rim, composed of the fellies D D; and E, the tire. The spokes are mortised into the hub in the usual manner, and their outer ends are tenoned to receive the thimbles F F. The latter are adapted to fit flush upon the spokes, as shown, and to secure them they may be threaded and screwed upon the ends of the spokes, as shown in the sectional views in the drawings. The outer ends of the thimbles are flanged to receive the inner convex edge of the rim.

To secure the rim to the spokes I employ screws or bolts G, inserted through the rim from the outside, and I provide the thimbles with threaded bushings H to receive such screws; but as it is not necessary that all of the spokes should be thus secured, the construction of some of the thimbles may be cheapened by omitting the bushings, as represented in Fig. 2 of the drawings.

At points where the ends of the fellies meet, I provide the spoke-thimbles with felly-plates I, consisting of flanges of sufficient width to receive and support the ends of the fellies. At these points the latter are secured by bolts J, passing through the flanges, and provided with nuts K on the under side thereof.

To tighten the tire of my improved wheel, the rim is sprung out of one of the sockets or thimbles and a leather washer interposed, and the rim may then be sprung back to place. By repeating this operation at each of the spokes the tire may be easily tightened.

Where the ends of the fellies meet, a metallic wedge, O, may be driven in to bind the rim. With equal facility broken spokes or pieces of fellies may be removed and replaced by new ones when necessary, and without removing the tire.

Having thus described my invention, I claim and desire to secure by Letters Patent of the United States—

1. The combination, with a spoke-thimble, of a threaded bushing, H, adapted to receive the bolt by which the rim is secured to the spoke, as set forth.

2. As an improvement in vehicle-wheels, the combination of the hub A, spokes B, thimbles F, having bushings H and felly-plates I, and rim C, substantially as and for the purpose set forth.

In testimony that I claim the foregoing as my own I have hereto affixed my signature in presence of two witnesses.

FREEMAN HENRY ROSSMAN.

Witnesses:
JOHN DYSON,
EDWARD M. GORING.